United States Patent
Miller et al.

(10) Patent No.: US 8,313,662 B2
(45) Date of Patent: Nov. 20, 2012

(54) METHODS FOR GLOBALLY TREATING SILICA OPTICS TO REDUCE OPTICAL DAMAGE

(75) Inventors: Philip Edward Miller, Livermore, CA (US); Tayyab Ishaq Suratwala, Pleasanton, CA (US); Jeffrey Devin Bude, Danville, CA (US); Nan Shen, Fremont, CA (US); William Augustus Steele, Tracy, CA (US); Ted Alfred Laurence, Livermore, CA (US); Michael Dennis Feit, Livermore, CA (US); Lana Louie Wong, Pleasanton, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 429 days.

(21) Appl. No.: 12/572,220

(22) Filed: Oct. 1, 2009

(65) Prior Publication Data

US 2011/0079931 A1    Apr. 7, 2011

(51) Int. Cl.
*B29D 11/00* (2006.01)
(52) U.S. Cl. ............... 216/24; 216/26; 216/97; 264/2.6; 264/344
(58) Field of Classification Search ............. 216/24, 216/26, 90, 97, 108, 109; 264/1.1, 2.6, 233, 264/344
See application file for complete search history.

(56) References Cited

U.S. PATENT DOCUMENTS

| | | | |
|---|---|---|---|
| 3,650,960 A | 3/1972 | Peterson et al. | |
| 5,086,352 A | 2/1992 | Yamagata et al. | |
| 5,325,230 A | 6/1994 | Yamagata et al. | |
| 5,410,428 A | 4/1995 | Yamagata et al. | |
| 5,616,159 A | 4/1997 | Araujo et al. | |
| 6,099,389 A | 8/2000 | Nichols et al. | |
| 6,205,818 B1 | 3/2001 | Seward | |
| 6,518,539 B2 | 2/2003 | Hackel et al. | |
| 6,620,333 B2 | 9/2003 | Brusaco et al. | |
| 6,705,125 B2 | 3/2004 | Peterson et al. | |
| 6,920,765 B2 | 7/2005 | Menapace et al. | |
| 2003/0007772 A1* | 1/2003 | Borrelli et al. .......... | 385/137 |

OTHER PUBLICATIONS

International Search Report and Written Opinion for PCT Patent Application No. PCT/US2010/049856 mailed on May 26, 2011, 18 pages.
Anonymous, Wikipedia, "Piranha Solution", Sep. 16, 2009, Retrieved from http://en.wikipedia.org/w/index.php?oldid=314413389 on Jan. 26, 2011, 4 pages.
Garcia-Macedo, J.A., et al., "Solvent and ligand effects on the optical properties of silver nanoparticles in a silica sol-gel film", Proceedings of SPIE, Aug. 2, 2009, vol. 7394, pp. 1-8.
Miller, P.E., et al., "Laser damage precursors in fused silica", Proceedings of SPIE, vol. 7504, Sep. 21, 2009, pp. 1-14.
Pulker, H.K., "Cleaning of Substrate Surfaces", Coatings on Glass, Elsevier, 1999, 15 pages.
Spierings, G.A., "Wet Chemical Etching of Silicate Glasses in Hydrofluoric Acid Based Solutions", Journal of Materials Science, 1993, vol. 28, pp. 6261-6273.
Miller, P.E., et al., "Laser damage precursors in fused silica", Proceedings of SPIE, vol. 7504, Dec. 29, 2009, pp. 1-14.

* cited by examiner

*Primary Examiner* — Mathieu D. Vargot
(74) *Attorney, Agent, or Firm* — Kilpaatrick Townsend & Stockton LLP

(57) ABSTRACT

A method for preventing damage caused by high intensity light sources to optical components includes annealing the optical component for a predetermined period. Another method includes etching the optical component in an etchant including fluoride and bi-fluoride ions. The method also includes ultrasonically agitating the etching solution during the process followed by rinsing of the optical component in a rinse bath.

11 Claims, 3 Drawing Sheets

METHODS FOR GLOBALLY TREATING SILICA OPTICS TO REDUCE OPTICAL DAMAGE

STATEMENT AS TO RIGHTS TO INVENTIONS MADE UNDER FEDERALLY SPONSORED RESEARCH OR DEVELOPMENT

The United States Government has rights in this invention pursuant to Contract No. DE-AC52-07NA27344 between the U.S. Department of Energy and Lawrence Livermore National Security, LLC, for the operation of Lawrence Livermore National Laboratory.

BACKGROUND

In recent years, high-power lasers are being increasingly used in various industries. Optical components, such as lenses, windows, etc. are prone to damage when exposed to high-power, high-energy laser irradiation. All optical materials will ultimately damage at sufficiently high laser intensities through processes intrinsic to the optical material. Such intrinsic optical damage is the result of high-energy deposition through multi-photon ionization and is determined by the material's bulk electronic structure. Such damage normally occurs at intensities in excess of 200 $GW/cm^2$. In practice, however even the highest quality optical components can damage at fluences well below their intrinsic damage threshold.

There are currently various methods in use to prevent and/or mitigate optical damage. One solution is to produce high quality optical materials that resist such optical damage. Even the highest quality bulk optical material, however, is not immune from optical damage at the surface of the material. One source of surface damage is caused by the absorption of sub-band-gap light by optical damage precursors. Optical damage precursors are defects that are extrinsic to the bulk optical material. Absorption of high fluence light by these precursors result in the explosive ejection of material from the surface, which leaves pits that may be a few microns to tens of microns in diameter. Surface fractures typically accompany these pits leading to further degradation of the optical material upon further irradiation by high-power or high-energy laser. Such damage becomes increasingly problematic as the operating wavelength becomes shorter, moving from red to ultraviolet. Similarly, in general it has been found that the higher the fluence and the shorter the pulse-length, the higher the damage intensity. Depending on the details of the optical finishing process, fused silica typically exhibits surface damage when exposed to a 3 ns pulse of 355 nm light at fluences between 1-30 $J/cm^2$, which is considerably lower than the (<100 $J/cm^2$) intrinsic damage threshold of a high quality bulk material. In addition, repeated and prolonged irradiation causes the damage to proliferate to unacceptable levels.

The density and nature of optical damage precursors is highly dependent on the finishing and handling process used during fabrication of the optical component. Damage precursors are primarily associated with photoactive impurities, surface fractures, and laser induced damage sites. Photoactive impurities may be introduced into the near surface region of the optical component during polishing. Surface fractures may include fractures introduced during the grinding process, as well as scratches or indentation fractures formed during the polishing, cleaning, handling, or use of the optical component. Optically induced surface damage sites may include fractured locations.

Many solutions have been proposed to increase the resistance of fused silica optical components that may enable the optical component to withstand high fluence irradiation particularly in the ultra-violet (UV) portion of the spectra. One solution is to remove the photoactive impurities and fractures, both of which can act as light absorbing damage precursors, during the optical component fabrication process. For example, U.S. Pat. No. 6,099,389 to Nichols et al. describes use of several conventional controlled grinding steps followed by conventional polishing. To prevent residual ceria in the polishing layer from acting as an optical damage precursor, Nichols describes the use of zirconia-based slurry, or the use of an etching step to remove residual ceria from the polishing layer. Another proposed solution is to use a specialized fabrication process. For example, U.S. Pat. No. 6,920,765 to Menapace et al. describes a fabrication process that includes conventional grinding followed by a conventional polishing step and a Magneto-rheological polishing step. The polishing layer is subsequently removed by etching. Yet another method for producing optics with reduced damage is described in U.S. Pat. No. 6,518,539 to Hackel. There repetitive scanning by a laser with increasing fluences is performed over the entire optic to reveal location of each surface defect. Once a defect location is revealed, the defect location is treated using global heating or etching of the optical component. In addition, U.S. Pat. No. 6,620,333 to Brusasco discloses a method where the optical component is first irradiated with laser to initiate damage and then a laser ablation process is used to treat the damaged area. This type of destructive mitigation method risks making the optical component more susceptible to future damage or may end up damaging a different aspect of the optical component.

All of the conventional techniques discussed above require a degree of preciseness and control that is difficult to achieve. In addition, some of the methods ignore one of the most prevalent precursors of optical damage: fracture surfaces associated with scratches (dynamic fractures) and "digs" (static fractures). Thus, there is a need in the art for improved processes for increasing the resistance of optical components to optical damage. In addition, more efficient means for mitigating previously initiated optical damage sites is needed.

SUMMARY

The present invention relates generally to mitigating and preventing damage to optical components. More specifically, the present invention is related to methods for mitigating and preventing damage caused to optical components by high intensity light sources, e.g., lasers. The present invention provides techniques to globally treat damage-prone silica optics by chemically leaching contaminants from optical surfaces, thermally treating entire optical components to reduce damage precursor densities, and/or chemically etching precursor layers from the surface using fluoride based etching chemistries.

According to a particular embodiment of the present invention, an optical component to be exposed to high intensity light source is exposed to an aqueous solution including one or more mineral acids. The mineral acids may include nitric acid ($HNO_3$), hydrochloric acid (HCl), perchloric acid ($HClO_4$), sulphuric acid ($H_2SO_4$), or phosphoric acid ($H_3PO_4$) and combinations thereof. The optical component may be heated to a temperature in the range of between 50° C. and 120° C. as part of the process.

In another embodiment of the present invention, a fused silica based optical component is placed in a furnace and heated to a temperature of between 700° C. and 1050° C. for a period sufficient to increase the surface damage threshold. In one implementation, the component is heated for 24 hours. In other embodiments, the component is heated for between 24 hours and 48 hours. Preferably, the optical component is then cooled under controlled conditions.

In another embodiment of the present invention, an optical component having a region that is potentially susceptible to optical damage is exposed to an aqueous solution of hydrofluoric acid, or an acidic solution including fluoride ions, or bi-fluoride ions. A surface layer from the optical component is removed by the aqueous etchant. The aqueous solution is preferably ultrasonically agitated during the process. After completion of the etching process, the component is rinsed in a solution including high purity water, e.g., deionized or distilled water.

In another embodiment of the present invention, an optical component is exposed to an aqueous solution of mineral acids including at least one of nitric acid ($HNO_3$), hydrochloric acid (HCl), perchloric acid ($HClO_4$), sulphuric acid ($H_2SO_4$), or phosphoric acid ($H_3PO_4$). The aqueous solution is then heated with the optical component to a temperature in the range of about 50° C. and 120° C. Following that, the optical component is placed in an aqueous etching solution including species of one of hydrofluoric acid, fluoride ions, or bi-fluoride ions, and a surface layer from a region of the optical component that includes optical damage precursors is removed to minimize etch-related optical damage precursor by-products. In addition, the aqueous solution is agitated using an ultrasonic or megasonic method during the etching process.

In some embodiments, another method for mitigating optical damage includes treating the damaged component in an aqueous solution including species of one of hydrofluoric acid, fluoride ions, or bi-fluoride ions which etch the component. The etching removes a surface layer from the component to minimize etch-related optical damage precursor by-products, agitating the aqueous solution using an ultrasonic or megasonic method, and manipulating the etch rate of the aqueous solution to be lower than a removal rate for reaction byproducts.

In another approach the method includes treating the damaged optical component in an aqueous solution including species of one of hydrofluoric acid, fluoride ions, or bi-fluoride ions which etch the component. The etching removes a surface layer from the region to minimize optical damage precursor by-products. The aqueous solution may be agitated using an ultrasonic or megasonic method, and is preferably substantially free of cations capable of forming hexafluorosilicate salts with low solubility in the aqueous solution. The cations typically include one or more of sodium ($Na^+$), potassium ($K^+$), magnesium ($Mg^{2+}$) calcium ($Ca^{2+}$), barium ($Ba^{2+}$), zinc ($Zn^{2+}$), lead ($Pb^{2+}$), Iron ($Fe^{2+}$ and $Fe^{3+}$), or aluminum ($Al^{3+}$).

In other embodiments, optical damage is mitigated by placing the optical component in an aqueous solution including species of one of hydrofluoric acid, fluoride ions, or bi-fluoride ions to etch the component. The etching removes a surface layer from the component to minimize etch-related optical damage precursor by-products. preferably the aqueous solution is agitated using an ultrasonic or megasonic method, with ethylene diamine bifluoride, or fluoride salts of primary, secondary, or tertiary ammonium cations added to the aqueous solution.

In some embodiments, the optical component is exposed to an aqueous solution of mineral acids including at least one of nitric acid ($HNO_3$), hydrochloric acid (HCl), perchloric acid ($HClO_4$), sulphuric acid ($H_2SO_4$), or phosphoric acid ($H_3PO_4$). The component and the aqueous solution are heated to a temperature in the range of about 50° C. and 120° C., and thereafter to a temperature of between 700° C. and 1050° C. for a period of between 24 hours and 48 hours in a furnace.

The following detailed description, together with the accompanying drawings will provide a better understanding of the nature and advantages of the present invention.

DETAILED DESCRIPTION OF SPECIFIC EMBODIMENTS

Embodiments of the present invention provide methods for mitigating damage in optical components exposed to lasers or other high energy beams.

The process used for mitigating existing optical damage or treating an optical component to be more resistant to laser induced damage may depend on the process used to manufacture the optical component. For example, optical components that are polished using a ceria or an iron-based slurry may include residual photoactive impurities that are left behind by the polishing material. Photoactive impurities in the near surface layer can absorb high-intensity light thus transferring energy from the beam into near surface of the optical component raising the local temperature. If the combination of the intensity of the beam and the strength of the absorption are sufficient, a small local plasma can ignite on the surface of the optic. Such plasma may itself absorb energy from the light beam further raising the local temperature until the end of the termination of the light pulse. Physically, the damage is a manifestation of the plasma including melted material, ejecta, and thermally induced fractures. The process used to eliminate these impurities may be different from a process used for mitigating a surface fracture in the optical component. In some instances, it has been observed that surface optical damage in silicate glasses can occur at fluences ranging from a few $J/cm^2$ to over 30 $J/cm^2$. Hence, several different methods for treating optical components are described below. Selection of the particular method typically depends on the type of the optical material, the process used to finish the optic, and the nature and extent of the optical damage or optical damage precursors.

Figure 1:
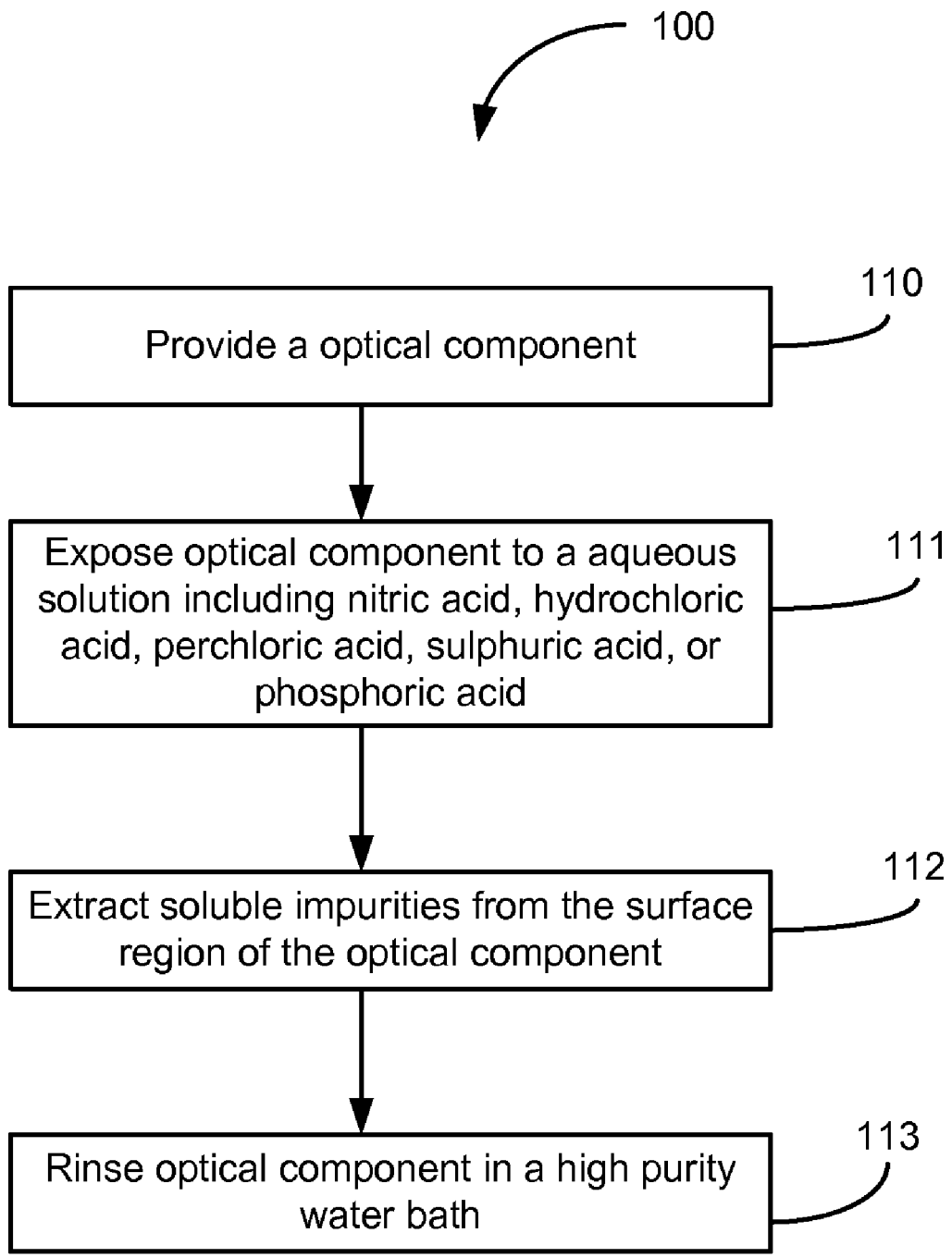
FIG. 1 is a flow diagram of a process for treating an optical component to prevent laser-induced optical damage according to an embodiment of the present invention.

FIG. 1 is a flow diagram for a process 100 for treating an optical component according to an embodiment of the present invention. Process 100 is referred to herein as "leaching." Leaching is a process whereby the residual photoactive impurities, described above, can be removed. At step 110, the optical component to be treated is provided. At step 111, the optical component is immersed in an aqueous solution containing one or more mineral acids. The mineral acids may include nitric acid ($HNO_3$), hydrochloric acid (HCl), perchloric acid ($HClO_4$), sulphuric acid ($H_2SO_4$), or phosphoric acid ($H_3PO_4$) or combinations thereof. Not all acids have to be present in the aqueous solution, and even a single acid may be used. The combinations and percentages of the acids may be chosen based on the type of the optical material and nature and extent of the optical damage. When the optical component is exposed to the aqueous solution, the soluble impurities, e.g., metallic elements or metallic oxides, from the surface region of the optical component are removed, at step 112. The optical component itself, however, shows negligible solubility to the aqueous solution. Hence there is minimal danger of degrading the optical component itself.

In one embodiment, hydrogen peroxide ($H_2O_2$) is added to the aqueous solution to increase the rate at which the impurities are removed. For example, a solution containing about 25% to 50% by weight of nitric acid and about 2% to 10% by weight of hydrogen peroxide has been shown to be effective at removing the soluble impurities. The length of time needed to effectively remove all the soluble impurities from the surface depends on the type of aqueous solution used, the temperature of the solution, and the type of optical component being treated. In one implementation, however, the optical component is treated using process 100 for about 2 hrs to about 50 hrs. In some embodiments, the aqueous solution also may be heated to a temperature of between 50° C. and 120° C. during the leaching process. After the leaching process is complete, the component is preferably rinsed with high purity water at step 113. The rinsing helps to remove any residual material from the surface of the optical component left by the leaching process.

Conventional processes provide optical mitigation techniques which use a carbon dioxide ($CO_2$) laser operating in the infrared (IR) to locally heat and remove damage precursors on the silica surface. One disadvantage of this process is that it requires locating and individually treating each site. The present invention allows global thermal mitigation of an entire optic without the need to explicitly locate individual damage sites or optical damage precursors.

Figure 2:
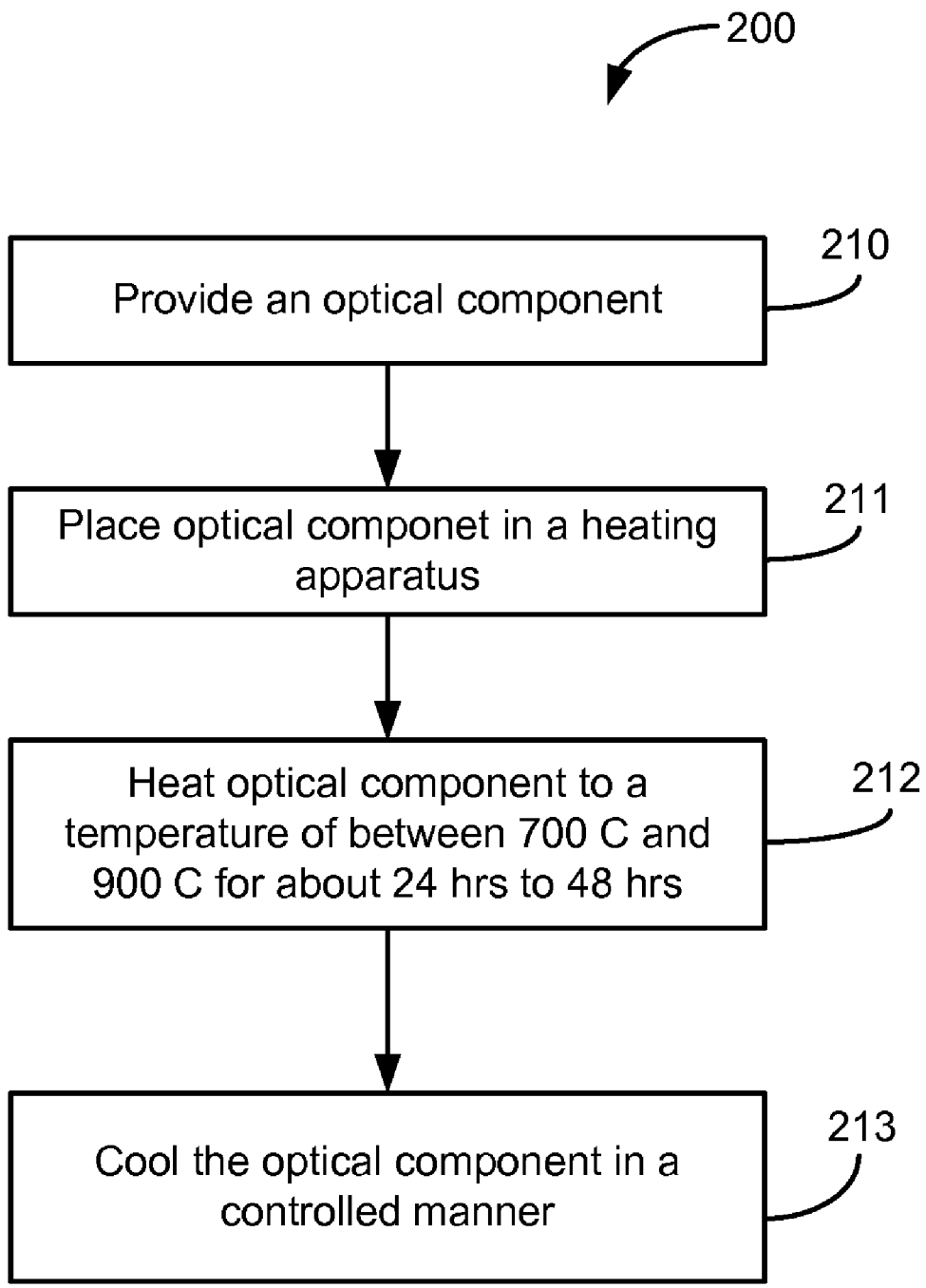
FIG. 2 is a flow diagram of a process for mitigating damage to an optical component caused by a high-intensity light according to an embodiment of the present invention.

FIG. 2 is a flow diagram of another process 200 for mitigating optical damage in an optical component according to an embodiment of the present invention. At step, 210 an optical component having a damage region is provided. At step 211, the optical component is placed in a heating apparatus, e.g. a furnace. The entire optical component is isothermally heated at temperature below the softening point of the optical component material at step 212 for a predetermined period. In one embodiment, the temperature ranges between 700° C. and 1050° C. At step 213, the optical component is cooled in a controlled manner, for example, by slowly reducing the temperature. Any of the conventional cooling methods may be used. The time for which the process is to be carried out depends on the extent and nature of damage and material of optical component. The time required for thermal mitigation can range between 24 hours to 48 hours. In one embodiment, the time is at least 24 hours. In general, the longer the anneal time, the better the results. Similarly, the higher the anneal temperatures, the better the results. In one embodiment, heating the optical component at a temperature of 850° C. for 24 hours has shown to provide acceptable results. The higher temperature is advantageous in removing damage precursors from larger surface flaws. Isothermal anneals, such as process 200, can be performed at the highest temperature which does not result in surface degradation or devitrification of the optical component.

It has been observed that optical components treated with process 200 show a significant improvement in their ability to withstand optical damage. Because the entire optical component is heated and cooled in a controlled environment, there are no large temperature gradients and consequently the optical component is subjected to minimal stress. Since the temperature used is below the reflow (softening) temperature of the optical component, there is minimal to no material flow and minimal to no risk of devitrification or deformation of the optical component. The mechanism responsible for reduction in the damage precursors is believed to be a result of surface diffusion, which effectively reconstructs the surface at the atomic scale, thereby eliminating the surface precursor layer. Such surface diffusion mediated processes occur at temperatures significantly lower than the bulk reflow temperature of the optical component. High temperature isothermal annealing below the softening point temperature of the optical component is effective in improving damage resistance of existing surface flaws that may be introduced during manufacturing of the optical component.

Figure 3:
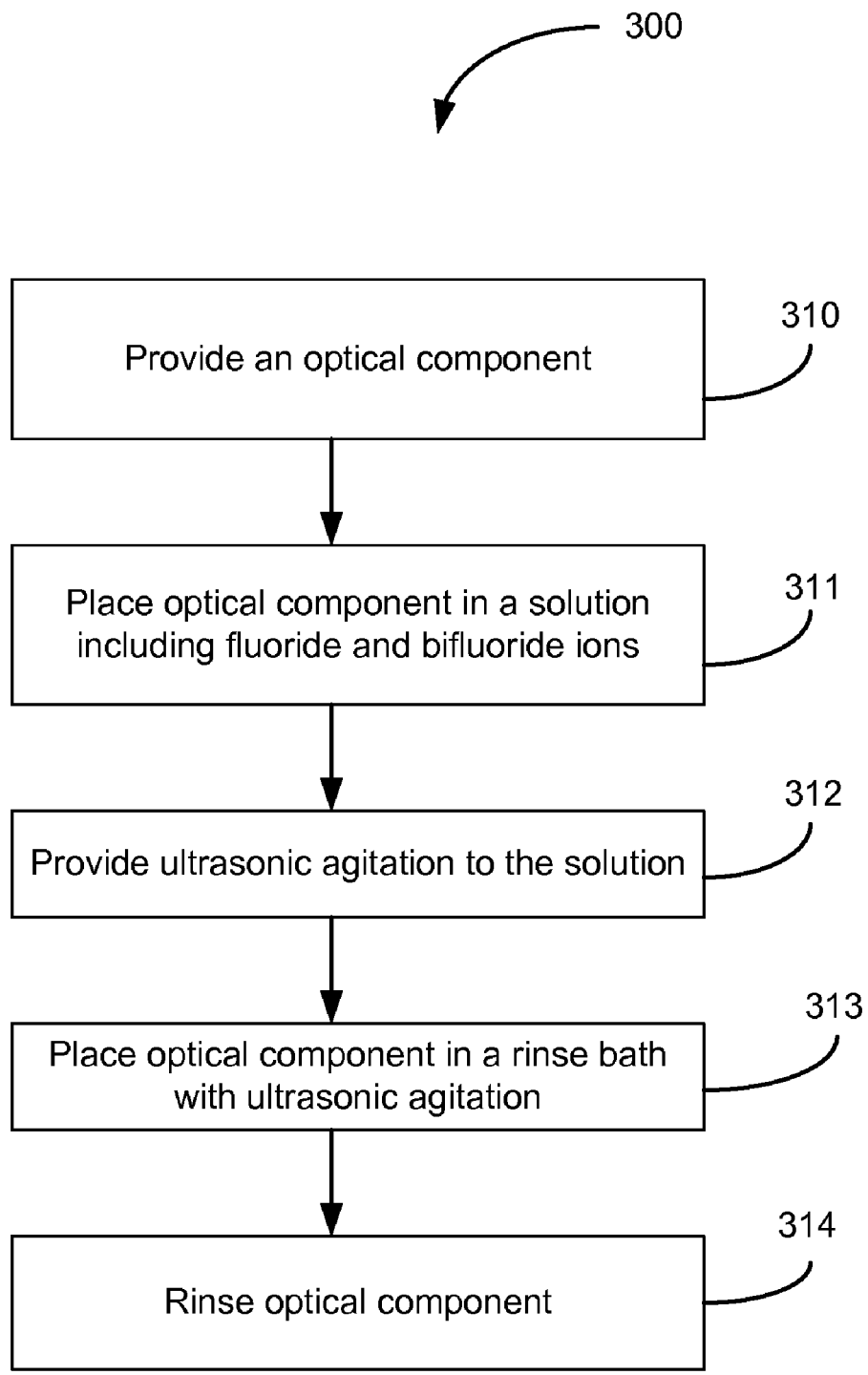
FIG. 3 is a flow diagram of a process for treating an optical component to prevent laser-induced damage according to another embodiment of the present invention.

Another embodiment of the present invention provides a method of removing the damage precursors by using an etching technique. Etching in this embodiment refers to chemical removal of a near surface region of the optical component through the application of suitable acidic solution. In one embodiment, the acidic solution may include fluoride ($F^-$) or bifluoride ($HF_2^-$) ions. FIG. 3 is a flow diagram of a process 300 for treating an optical component to improve its resistance to optical damage or to mitigate an existing optical damage. At step 310, an optical component that is to be treated is provided. At step 311, the optical component is exposed to a solution including fluoride and bifluoride ions. The exposure of the optical component to the acidic solution results in the removal of a portion of the surface region. The amount to be removed preferably ranges between approximately 100 nanometers and about 100 microns. The amount to be removed can be controlled by adjusting the concentration of the reagents used, the temperature, and the time used for etching. The amount of material removal required depends on extent and nature of the damaged area and the type of the optical component. For an optical component with small surface scratches or fractures, a short etch time is enough to improve its laser damage threshold. For larger cracks and fractures, a longer etch time may be needed.

In some instances, however, a longer etch time can lead to a reduction in damage threshold. One of the reasons for this degradation in performance may be due to formation of reaction products of the etching reaction, which can deposit on the surface and act as damage precursors, which lower the fluence required to initiate a optical damage site or enlarge a previously initiated damaged site. These re-deposited precursors may be the result of the deposition of a defective layer which condenses from the etch-surface/solution boundary layer or the precipitation of highly absorbing salts, e.g., those containing hexafluorosilicate ($SF_6^{2-}$) anion, which is the product of silicate etching reaction.

To prevent, reduce, or remove the precipitation of such precursors, at step 312, the acidic solution is ultrasonically agitated, e.g., using kHz agitation or megasonically agitated, e.g., using MHz agitation, during the etching process. Such agitation may be performed during all or a portion of process 300. For example, ultrasonic agitation is provided during at least the final 30 minutes of process 300. The ultrasonic transducer used for the agitation may operate in a frequency and power range that does not induce physical surface damage. This surface damage is typically manifested as surface pitting and/or fracturing. This is avoided by maintaining the frequency is in the range of 100 Kilohertz (kHz) to about 3 Megahertz (MHz). In some embodiments, megasonic frequencies can be used for the agitation process. The ultrasonic/megasonic agitation prevents precipitation of the etch by-products from accumulating in a stagnant boundary layer at the surface of the optical component and can dislodge any precipitate that may be formed on the surface of the fracture. Ultrasonic/megasonic agitation can also remove absorbing impurities, e.g., ceria left on the surface of the optical component during polishing process. As the surface is etched, the impurities enter the etch-boundary layer and are trapped during drying.

At step 313, the optical component is placed in a rinse bath containing high purity water, e.g., deionized or distilled water. Ultrasonic/megasonic agitation may be provided during the rinse cycle to dislodge any precipitate, which may gather on the surface of the optical component. At step 314, the optical component is spray rinsed with high purity water for a period enough to ensure removal of all remaining etch-related reaction products and impurity cations. Preferably the optical component is rinsed for about 30 minutes using the spray rinse with high purity water having a conductance of greater than 18 Mega-ohm/cm for a rinse time of at least 15 minutes. Although Ultrasonic or megasonic agitation is one of the methods to reduce or remove the by-products that may be formed during the etching process, other techniques can be used in conjunction with, or in lieu of, the agitation technique described above.

Typically the etch rate of the solution is controlled to reduce the concentration of material in the etch-boundary layer. The rate at which the material of the optical component is etched is reduced to below the rate at which the reaction by-products are removed from the interfacial region. In one approach, lowering of the etch rate is achieved by diluting the etching solution with water.

In another embodiment, the risk of precipitation of etch by-product is reduced by excluding from the etching solution those cations that form insoluble salts in the presence of hexafluorosilicate or bifluoride anions. Such cations include $Na^+$, $K^+$, $Mg^{2+}$, $Ca^{2+}$, $Ba^{2+}$, $Zn^{2+}$, $Pb^{2+}$, $Fe^{2+}$, $Fe^{3+}$, or $Al^{3+}$ cations. The fluoride in the etching solution may be provided using hydrofluoric acid (HF). In some embodiments, additional fluoride ions may be introduced into the etching solution by adding fluoride salts including ethylene diamine bifluoride ($NH_4C_2H_4NH_4F_2$) or salts of primary, secondary, or tertiary ammonium cations.

In yet other embodiments, the pH of the acidic solution may be controlled by adding the fluoride ion in form of ammonium fluoride ($NH_4F$). The fluoride salts increase the total number of fluoride ions to react with the silicon oxide ($SiO_2$) of the optical component resulting in hexafluorosilicate anions. In addition, because the fluoride ion is the conjugate base of HF, addition of a fluoride salt creates a buffered solution stabilizing the pH of the etch solution. The pH stability provides a constant etch rate by maintaining the fractional distribution of fluoride species in the etch solution at a nearly constant level. In instances where ammonium fluoride ($NH_4F$) is used as a component of the etchant, the precipitation of ammonium hexafluorosilicate can be minimized by judicious choice of the ammonium fluoride concentration used to stabilize the pH of the solution. The phase equilibrium between the aqueous and solid phases of ammonium hexafluorosilicate can be expressed as:

$$((NH_4)_2SiF_6)_s = 2NH_4^+{}_{aq} + SiF_6^{2-}{}_{aq}$$

where the subscripts s and aq denote the solid and aqueous phases, respectively.

The thermodynamic equilibrium constant, the solubility product ($K_{sp}$) can be expressed in terms of the local molar concentration of the ammonium ion and the hexafluorosilicate anion in the solution.

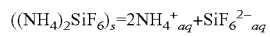

As indicated above, the solubility of the ammonium hexafluorosilicate salt varies in proportion to the inverse square of the concentration of the ammonium ion in the solution. In other words, the likelihood of formation of precipitate can be minimized by controlling the ratio of HF and $NH_4F$ used during the etching process. In one embodiment, fused silica is etched in an aqueous solution that is initially 1.2 moles per liter in HF and 3.0 moles per liter in $NH_4F$ for a period of 30 minutes to improve its laser damage performance. It is understood, however, that various other combinations of HF and $NH_4F$ may be used in the aqueous etching solution depending on the nature and amount of damage to be mitigated.

It will be appreciated that processes 100, 200, and 300 described herein are illustrative and that variations and modifications are possible. Steps described as sequential can be executed in parallel, the order of steps can be varied, and steps can be modified or combined. In addition, processes 100, 200, and 300 may be combined with each other to treat an optical component. For example, an optical component may be treated first using process 100, followed by process 300 and finally by process 200. One skilled in the art will realize that other combinations of processes 100, 200, and 300 are possible.

In addition, several of the steps and sub-steps described for the various processes for treating an optical component can be combined to create a custom process depending on the type of optical component to be treated and the nature and extent of the optical damage. For example, an optical component may be treated using process 100 combined with some elements of process 200 and process 300. One skilled in the art will realize that other combinations are also possible.

Thus, although the invention has been described with respect to specific embodiments, it will be appreciated that the invention is intended to cover all modifications and equivalents within the scope of the following claims.

What is claimed is:

1. A method for mitigating optical damage in an optical component, the method comprising:
   providing an optical component having a region including optical damage precursors, the damage precursors including laser damage sites, scratches, and chemical impurities;
   placing the optical component in an aqueous solution including species of one of hydrofluoric acid, fluoride ions, or bi-fluoride ions, the aqueous solution having an etch rate;
   agitating the aqueous solution at a megasonic frequency after placing the optical component in the aqueous solution;
   removing a surface layer from the region;
   thereafter, placing the optical component in a rinse bath comprising deionized water for a first time duration and agitating the rinse bath at an ultrasonic frequency; and
   after expiration of the first time duration, spray rinsing the optical component for a second time duration.

2. The method of claim 1 wherein removing the surface layer comprises removing about 100 nanometers to about 100 microns of material from the region.

3. The method of claim 1 wherein the second time duration is at least 15 minutes.

4. The method of claim 1 wherein the aqueous solution contains hydrofluoric acid and high purity water.

5. The method of claim 1 further comprising manipulating the etch rate of the aqueous solution to be lower than a removal rate for byproducts generated during the removing step.

6. The method of claim 1 wherein the aqueous solution is substantially free of cations capable of forming hexafluorosilicate salts with low solubility in the aqueous solution.

7. The method of claim 6 wherein the cations include one or more of sodium ($Na^+$), potassium ($K^+$), magnesium ($Mg^{2+}$) calcium ($Ca^{2+}$), barium ($Ba^{2+}$), zinc ($Zn^{2+}$), lead ($Pb^{2+}$), iron ($Fe^{2+}$, $Fe^{3+}$), or aluminum ($Al^{3+}$).

8. The method of claim 1 further comprising adding ethylene diamine bifluoride, or fluoride salts of primary, secondary, or tertiary ammonium cations to the aqueous solution.

9. The method of claim 1 further comprising adding ammonium fluoride to the aqueous solution to stabilize pH concentration of the aqueous solution.

10. The method of claim 9 wherein the aqueous solution includes 1.2 moles per liter in hydrofluoric acid and 3 moles per liter in ammonium fluoride.

11. The method of claim 1 wherein the first time duration is at least 30 minutes.

* * * * *